(12) United States Patent
Jeong et al.

(10) Patent No.: US 10,647,862 B2
(45) Date of Patent: May 12, 2020

(54) PHOTONIC CRYSTAL INK COMPOSITION COMPRISING LIGHT-ABSORBING NANOPARTICLES AND PHOTONIC CRYSTAL STRUCTURE FORMED USING THE SAME

(71) Applicants: Hyundai Motor Company, Seoul (KR); Kia Motors Corporation, Seoul (KR); Korea Advanced Institute of Science and Technology, Daejeon (KR)

(72) Inventors: Chan Ul Jeong, Seoul (KR); Sang Hoon Han, Daejeon (KR); Jong Bin Kim, Daejeon (KR); Shin Hyun Kim, Daejeon (KR); Gun Ho Lee, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/193,673

(22) Filed: Nov. 16, 2018

(65) Prior Publication Data
US 2020/0017696 A1   Jan. 16, 2020

(30) Foreign Application Priority Data
Jul. 10, 2018  (KR) ........................ 10-2018-0080064

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 11/037* | (2014.01) | |
| *G02B 1/02* | (2006.01) | |
| *C09B 59/00* | (2006.01) | |
| *C09D 11/107* | (2014.01) | |
| *C09D 11/101* | (2014.01) | |

(52) U.S. Cl.
CPC ............ *C09D 11/037* (2013.01); *C09B 59/00* (2013.01); *C09D 11/101* (2013.01); *C09D 11/107* (2013.01); *G02B 1/02* (2013.01)

(58) Field of Classification Search
USPC ................. 522/74, 6, 71, 189, 184, 1; 520/1
See application file for complete search history.

(56) References Cited

U.S. PATENT DOCUMENTS

| | | | | |
|---|---|---|---|---|
| 2005/0101684 A1* | 5/2005 | You | .................. | C08G 59/18 522/1 |
| 2015/0147700 A1* | 5/2015 | Choi | ..................... | G02B 5/223 430/287.1 |

FOREIGN PATENT DOCUMENTS

| | | |
|---|---|---|
| KR | 10-2008-0073061 A | 8/2008 |
| KR | 10-2009-0108969 A | 10/2009 |

* cited by examiner

*Primary Examiner* — Jessica Whiteley
(74) *Attorney, Agent, or Firm* — Mintz Levin Cohn Ferris Glovsky and Popeo, P.C.; Peter F. Corless

(57) ABSTRACT

Disclosed are an ink composition including light-absorbing nanoparticles and a photonic crystal structure formed using the same. The ink composition may include inorganic particles; monomer; photoinitiator; and nanoparticles light-absorbing nanoparticles to provide the photonic crystal structure. As consequence, problems such as low color sharpness, which makes photonic crystals visible, and attaining high productivity may be eliminated. Moreover, white scattering can be reduced, and thus a distinctive color can be exhibited even when there is a difference between a reflection angle and an observation angle of light, thereby improving visibility.

18 Claims, 5 Drawing Sheets

PHOTONIC CRYSTAL INK COMPOSITION COMPRISING LIGHT-ABSORBING NANOPARTICLES AND PHOTONIC CRYSTAL STRUCTURE FORMED USING THE SAME

CROSS-REFERENCE TO RELATED APPLICATION

This application claims under 35 U.S.C. § 119(A) the benefit of priority to Korean Patent Application No. 10-2018-0080064 filed on Jul. 10, 2018, the entire contents of which are incorporated herein by reference.

TECHNICAL FIELD

The present invention relates to an ink composition that includes nanoparticles and a photonic crystal structure formed using the same. A photonic crystal structure may improve color sharpness by adding light-absorbing nanoparticles.

BACKGROUND OF THE INVENTION

When colloidal particles are dispersed in a photopolymerizable monomer, repulsive force between the colloidal particles is induced by the combination of the colloidal particles and the monomer, and as such, spontaneous three-dimensional lattice may be formed by the particles and subsequently lattice structure may be solidified by the photopolymerization of monomers. However, the formed structure may have poor color sharpness due to white scattering, and show sharp color development when the reflection angle of light is different from the observation angle thereof, thus deteriorating the aesthetic properties of materials and thereby lowering the value of use thereof as a coating material.

In the related arts, a method of manufacturing photonic crystals in various shapes, including hemispherical patterning of photonic crystals using a photopolymerizable colloidal dispersion medium has been introduced. For example, photopolymerizable monomer solution containing colloidal particles may be patterned on the surface of a substrate and cured to thereby produce a structure having a photonic crystal pattern. However, any configuration for improving the color sharpness of the cured structure has not been provided.

In addition, in the related arts, a coating composition, which is improved in temperature resistance, moistureproofness, fingerprint resistance and washability, has been introduced. The coating composition may comprise a photocurable hard coating agent including a colloidal inorganic oxide, an additive including silica, and a photoinitiator. However, the coating composition may not provide any configuration that may increase aesthetic properties of materials by improving the color sharpness of the coating product.

SUMMARY OF THE INVENTION

In preferred aspects, the present invention may provide a photopolymerizable structure, which may exhibit high color sharpness by suppressing white scattering. As such, sharp color development from the photopolymerizable structure, even when the reflection angle and observation angle of light are different from each other, may be obtained.

The aspects of the present invention are not limited to the foregoing, and will be able to be clearly understood through the following description and to be realized by the means described in the claims and combinations thereof.

In one aspect, provided is an ink composition, or a photonic crystal ink composition. The ink composition may include: inorganic particles ("photonic crystal inorganic particles"); a monomer ("photopolymerizable monomer"); a photoinitiator; and nanoparticles absorbing light.

The "inorganic particles" or "inorganic particle" is meat by a material having particular shape. Exemplary inorganic particles may include inorganic components, such as metal and non-metallic components (e.g., Si, O, N, P, or S) excluding carbon, or compounds thereof as a major component, for example, having a content greater than about 50 wt %, about 60 wt %, about 70 wt %, about 80 wt %, about 85 wt %, about 90 wt %, about 95 wt %, or about 98 wt % of the total weight of the particle. In addition, exemplary inorganic particles may have a size ranging from about 1 nm to about 1 mm. For example, inorganic nanoparticles may have a size ranging from about 1 nm to about 1000 nm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, or from about 1 nm to about 1000 nm.

The term "photonic crystal" as used herein refers to a material having a crystal structure that can be visible upon irradiation of light, for example, by scattering, absorbing, and reflecting the light. Exemplary photonic crystal may be visible by color upon irradiating light.

The term "photoinitiator" as used herein refers to a compound or a material that initiates or promote initiation of a chemical reaction (e.g., condensation reaction, polymerization or cross-linking reaction) upon irradiation by a light (e.g., UV or visible light). Exemplary photoinitiator may suitably initiate polymerization reaction of monomers included in a dispersion or solution without changing or modifying chemical properties of the monomers.

The term "light absorbing" is meant by a property of absorbing electrons or photons having a specific frequency or a specific wavelength (e.g., UV or visible light), for example, on a surface of a material or by molecular resonance, thereby presenting a color of the material.

The term "monomer" as used herein refers to a basic repeating unit of polymer or resin before polymerizing, curing, cross-linking or solidification, for example, by chemically, thermally or radiation (e.g., UV or visible light) curing.

The term "photopolymerizable" is meant by a property of a material that may be polymerized, cured, cross-linked or solidified upon irradiation of light (e.g., UV or visible light).

The nanoparticles may suitably include one or more selected from the group consisting of melanin, carbon black, and gold nanoparticles.

The term "nanoparticle" used herein refers to a particle having a size ranging from about 1 nm to about 1000 nm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, or from about 1 nm to about 1000 nm, without limitation to a shape thereof.

The inorganic particles may suitably include one or more selected from the group consisting of silica, titanium dioxide, aluminum oxide, zirconium oxide, and zinc oxide.

The photopolymerizable monomer may suitably include one or more selected from the group consisting of diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, ethoxylated neopentyl glycol diacrylate (NPEOGDA), propoxylated neopentyl glycol diacrylate (NPPOGDA), trimethylol propane triacrylate (TMPTA), trimethylol propane trimethacrylate (TMPTMA), pentaerythritol triacrylate (PETA), ethoxylated propoxylated trimethylol propane triacrylate (TMPEOTA)/(TMPPOTA), propoxylated glyceryl triacrylate, tris(2-hydroxyethyl) isocyanurate triacrylate (THEICTA), pentaerythritol tetraacrylate (PETTA), hexanediol diacrylate (HDDA), and dipentaerythritol pentaacrylate (DPEPA).

The volume ratio of the inorganic particles and the photopolymerizable monomer may be of about 10% (v/v) to 50% (v/v).

The nanoparticles may be included in an amount of about 0.01 wt % to 10 wt % based on the total weight of the ink composition.

The inorganic particles may suitably have a diameter of about 80 nm to 1000 nm.

The "diameter" is meant by a maximum length of a straight line passing a center of a particle.

Preferably, the volume ratio of the inorganic particles and the photopolymerizable monomer may be of about 10% (v/v) to 20% (v/v) and the inorganic particles may have a diameter of about 85 nm to 150 nm.

In addition, preferably, the volume ratio of the inorganic particles and the photopolymerizable monomer may be of about 20% (v/v) to 40% (v/v) and the inorganic particles may have a diameter of about 120 nm to 220 nm.

The volume ratio of the inorganic particles and the photopolymerizable monomer may be of about 40% (v/v) to 50% (v/v) and the inorganic particles may have a diameter of about 150 nm to 260 nm.

The nanoparticles may suitably have a diameter of about 5 nm to 150 nm.

The inorganic particles in the photopolymerizable monomer may be self-assembled and cured.

A solvation layer may be formed on the surface of the inorganic particles.

In an aspect, provided is a photonic crystal structure including the ink composition as described herein. The photonic crystal structure may be manufactured by irradiating the photonic crystal ink composition with light.

The photonic crystal structure may have a reflection spectrum at a wavelength of about 400 nm to 700 nm.

The inorganic particles may form a three-dimensional lattice structure and the nanoparticles may be present in the space between inorganic particles.

The reflectance may be decreased in the wavelength range of about 400 nm to 700 nm with an increase in an amount of the nanoparticles.

In another aspect, provided is a method of producing a porous structure including the photonic crystal structure as described herein. The method may include preparing an ink composition comprising inorganic particles, a monomer, a photoinitiator and nanoparticles absorbing light, irradiating the ink composition with light to form the photonic crystal structure, and etching of the photonic crystal structure.

Further provided is a vehicle including the photonic crystal structure as described herein.

According to various exemplary embodiments of the present invention, the light-absorbing nanoparticles may be added to a photopolymerizable monomer dispersion solution that facilitates the formation of colloidal photonic crystals through spontaneous crystallization, thereby alleviating a problem of low color sharpness, which makes photonic crystals visible, and attaining high productivity. Moreover, white scattering may be reduced, and thus a distinctive color may be exhibited even when there is a difference between the reflection angle and the observation angle of light, thereby improving visibility.

The effects of the present invention are not limited to the foregoing, and should be understood to include all effects that can be reasonably expected based on the following description.

DETAILED DESCRIPTION

Figure 1:
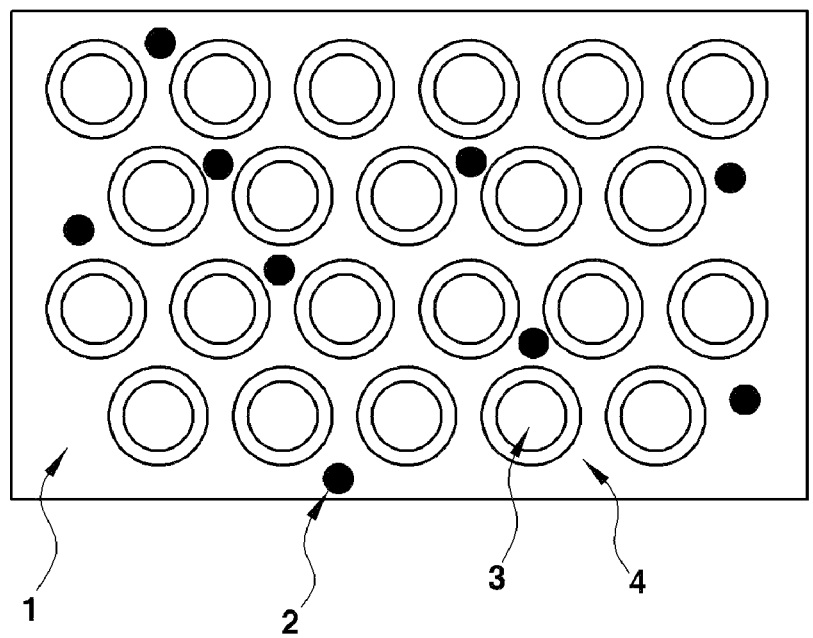
FIG. 1 shows an exemplary photonic crystal structure according to an exemplary embodiment of the present invention.

The above and other aspects, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention may provide an ink composition ("a photonic crystal ink composition") including light-absorbing nanoparticles and a photonic crystal structure formed using the same. The photonic crystal ink composition may include inorganic particles ("photonic crystal inorganic particles"), a monomer ("photopolymerizable monomer"), a photoinitiator, and nanoparticles for absorbing light.

The photonic crystal inorganic particles may be dispersed in the photopolymerizable monomer containing the photoinitiator to prepare a dispersion solution, to which the light-absorbing nanoparticles are then added, thereby preparing a photonic crystal ink composition.

The photonic crystal inorganic particles may suitably include one or more selected from the group consisting of silica, titanium dioxide, aluminum oxide, zirconium oxide and zinc oxide. Silica may be preferably used as the photonic crystal inorganic particles.

The photonic crystal inorganic particles may suitably have an average particle size of about 80 nm to 1,000 nm, about 100 nm to 500 nm, or particularly about 100 nm to 300 nm.

In addition, a volume ratio of the photonic crystal inorganic particles and the photopolymerizable monomer may fall in the range of about 10% (v/v) to 50% (v/v). When the volume ratio of the photonic crystal inorganic particles is less than about 10% (v/v), repulsive force between the photonic crystal inorganic particles may decrease due to the long distance therebetween, and thus the regular array formation of the particles may become impossible, making it difficult to realize color development. When the volume ratio of the photonic crystal inorganic particles is greater than about 50% (v/v), the viscosity of the composition may increase substantially, making it difficult to apply the resulting composition to a coating process.

When the photonic crystal inorganic particles are dispersed in the photopolymerizable monomer containing the photoinitiator, a portion of the monomer may form a solvation layer on the surface of the photonic crystal inorganic particles, and this solvation layer may apply repulsive force between the photonic crystal inorganic particles when the volume ratio of the photonic crystal inorganic particles is about 10% (v/v) or greater.

In particular, in order to develop color through reflection in the visible light range of 380 nm to 750 nm, when the volume ratio thereof relative to the photopolymerizable monomer is in the range of about 10% (v/v) to 20% (v/v), the average particle size of the photonic crystal inorganic particles may suitably be of about 85 nm to 150 nm. Also, when the volume ratio thereof relative to the photopolymerizable monomer is in the range of about 20% (v/v) to 40% (v/v), the average particle size of the photonic crystal inorganic particles may suitably be of about 120 nm to 220 nm, and when the volume ratio thereof relative to the photopolymerizable monomer is in the range of about 40% (v/v) to 50% (v/v), the average particle size of the photonic crystal inorganic particles may suitably be of about 150 nm to 260 nm.

The color of the photonic crystal structure may be determined by the size and the volume ratio of the photonic crystal inorganic particles. For example, when silica is used as the photonic crystal inorganic particles that constitute the photonic crystal structure and the volume ratio of silica particles is fixed to about 33% (v/v), a blue color may be shown at a particle size of about 150 nm, a green color may be shown at a particle size of about 175 nm, and a red color may be shown at a particle size of about 202 nm.

The photonic crystal structure that shows various colors may be manufactured by adjusting the size and volume ratio of the photonic crystal inorganic particles.

The photopolymerizable monomer may suitably include one ore more selected from the group consisting of diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, ethoxylated neopentyl glycol diacrylate (NPEOGDA), propoxylated neopentyl glycol diacrylate (NPPOGDA), trimethylol propane triacrylate (TMPTA), trimethylol propane trimethacrylate (TMPTMA), pentaerythritol triacrylate (PETA), ethoxylated propoxylated trimethylol propane triacrylate (TMPEOTA)/(TMPPOTA), propoxylated glyceryl triacrylate, tris(2-hydroxyethyl) isocyanurate triacrylate (THEICTA), pentaerythritol tetraacrylate (PETTA), hexanediol diacrylate (HDDA), and dipentaerythritol pentaacrylate (DPEPA). The photopolymerizable monomer is not limited to the examples listed above, and a variety of monomers containing an acrylate group may preferably be included in the ink composition.

In particular, even when color development becomes impossible using a single monomer, such as hexanediol diacrylate (HDDA), the monomer may be used in combination with a monomer that enables color development, such as pentaerythritol triacrylate (PETA).

The photopolymerizable monomer may include a photoinitiator. The photoinitiator may be contained in an amount of about 0.1 wt % to 10 wt % based on the amount of the photonic crystal ink composition. When the amount of the photoinitiator is less than about 0.1 wt %, a photopolymerization reaction may not occur, or may occur very slowly, thus making it impossible to cure the photonic crystal ink composition through light (UV) irradiation or increasing the curing time. When the amount thereof is greater than about 10 wt %, the photoinitiator may be converted into a radical through a photoreaction and thus be left behind, undesirably suppressing the photopolymerization reaction or deteriorating the properties of the photonic crystal structure. The kind of photoinitiator is not particularly limited, and may be selectively used depending on the type of UV lamp used for curing the photonic crystal ink composition, and examples thereof may include a ketone-based initiator, an ester-based initiator, and the like. The photoinitiator may preferably include an epoxyketone-based initiator or a phenylester-based initiator.

The light-absorbing nanoparticles may absorb light in the visible light range (e.g., 400 nm to 700 nm).

Typically, black particles may be used, and examples thereof may include, but are not limited to, particles such as carbon black, iron (or its oxide), aluminum (or its oxide), silver (or its oxide), magnesium (or its oxide), copper (or its oxide), a black pigment, a black polymer, and the like, or mixtures thereof. Any material may be used, so long as it is able to reduce white scattering. For example, gold may be contained as nanoparticles having light-absorbing properties.

The light-absorbing nanoparticles may suitably include at least one or more selected from the group consisting of melanin, carbon black, and gold nanoparticles. The amount of the light-absorbing nanoparticles may fall in the range of about 0.01 wt % to 10 wt %, or particularly about 0.01 wt % to 5 wt %, based on the total weight of the photonic crystal ink composition.

The average particle size of the light-absorbing nanoparticles may be in the range of 5 nm to 150 nm, or particularly of about 5 nm to 100 nm. Here, when the amount of the light-absorbing nanoparticles is less than the predetermined size, for example, less than about 5 nm, white scattering is not reduced. When the amount or particle size of the light-absorbing nanoparticles is greater than the predetermined size, for example, greater than about 150 nm, the array of photonic crystal inorganic particles may be interrupted and the structural color may not be exhibited due to high absorbance.

For example, melanin may be used as the light-absorbing nanoparticles, the preferable particle size may be in the range of about 50 nm to 120 nm and the preferable amount thereof may be in the range of about 0.1 wt % to 5 wt %, respectively.

When carbon black is used as the light-absorbing nanoparticles, the particle size may be in the range of about 10 nm to 50 nm and the preferable amount thereof may be in the range of about 0.01 wt % to 1 wt %, respectively.

When gold is used as the light-absorbing nanoparticles, the preferable particle size may be in the range of about 10 nm to 70 nm and the preferable amount thereof may be in the range of about 0.1 wt % to 1 wt %, respectively.

Among examples of the light-absorbing nanoparticles, melanin and carbon black may have an influence on the color sharpness of the photonic crystal structure obtained by curing the photonic crystal ink composition and also on the color development depending on the angle, but do not change the color of the photonic crystal structure itself.

In another aspect of the present invention, provided is a photonic crystal structure including the ink composition. The photonic crystal structure may be obtained by irradiating the prepared photonic crystal ink composition with light.

When the photonic crystal ink composition is irradiated with UV light, the photoinitiator may initiate or promote the reaction of the photopolymerizable monomer while forming a radical, whereby UV curing is carried out.

the process of irradiating the photonic crystal ink composition with UV light is not particularly limited, and a UV irradiation device typically known in the art may be used without limitation. For example, a UV lamp may be utilized.

When curing is performed through light irradiation, the photonic crystal inorganic particles dispersed in the photopolymerizable monomer may be self-assembled and thus cured.

FIG. 1 shows the photonic crystal structure, which is self-assembled and thus cured through light irradiation.

As shown in FIG. 1, the photonic crystal structure of the present invention may include exemplary photonic crystal inorganic particles 3 dispersed in an exemplary photopolymerizable monomer 1 while forming a three-dimensional lattice structure due to repulsive force between the particles, and exemplary light-absorbing nanoparticles 2 may be distributed in the space between the photonic crystal inorganic particles 3. Furthermore, a solvation layer 4 may be formed on the surface of the photonic crystal inorganic particles 3 distributed in the photopolymerizable monomer 1 to thus apply repulsive force between the particles so as to form a regular array.

The photonic crystal ink composition may penetrate between glass plates and may be photopolymerized through UV irradiation, thereby manufacturing a polymer film. However, the film formation process is not limited thereto, and various typical known coating processes may be used.

the photonic crystal ink composition may be subjected to photoetching to thus form a two-dimensional pattern. For example, UV light may be applied to a local region using a photomask, thereby selectively inducing photopolymerization, and the region not irradiated with light may be washed to thus form a pattern.

In another aspect, a porous structure may be obtained by a method including removing the photonic crystal inorganic particles from the photonic crystal structure through etching of the photonic crystal structure. For example, the method may suitably include preparing an ink composition comprising inorganic particles, a monomer, a photoinitiator and nanoparticles absorbing light, irradiating the ink composition with light to form the photonic crystal structure, and etching of the photonic crystal structure.

Preferably, only the exemplary photonic crystal inorganic particles 3 may be selectively removed from the photonic crystal structure, thereby obtaining a porous structure. The photonic crystal inorganic particles 3 may be removed using a compound such as a sodium hydroxide solution or hydrofluoric acid, and the porous structure may be maintained only by the cured photopolymerizable monomer 1 and the light-absorbing nanoparticles 2.

The space of the porous structure formed by removing the photonic crystal inorganic particles 3 may be filled with air, and the light reflectance of the surface of the porous structure may be increased due to an increase in the difference in refractive index between media. The color of the porous structure may become different from the original color of the photonic crystal structure.

EXAMPLE

A better understanding of the present invention will be given through the following examples, which are merely set forth to illustrate the present invention, but are not to be construed as limiting the scope of the present invention.

Example 1

(1) Preparation of Photonic Crystal Composition

Silica particles were dispersed such that the volume ratio of silica particles and ethoxylated trimethylol propane triacrylate (ETPTA) containing a photoinitiator was 33% (v/v), and melanin nanoparticles were further added thereto and mixed, thus preparing a photonic crystal ink composition.

As such, the mixing process was performed using a vortex mixer, after which the extent of mixing was increased using a sonicator.

As the photoinitiator, hydroxyl cyclohexyl phenyl ketone was added in an amount of 0.1 wt % based on the amount of the photonic crystal ink composition, and melanin nanoparticles were added in an amount of 0.1 wt %.

Furthermore, the melanin nanoparticles had an average particle size of 100 nm and the silica particles had an average particle size of 173 nm.

(2) Formation of Photonic Crystal Structure (Film)

The photonic crystal ink composition was made to penetrate between two glass plates having a 50 μm gap therebetween, irradiated with UV light, and cured, thus manufacturing a film layer.

(3) Formation of porous structure (film)

The photonic crystal structure (film) was treated with a hydrofluoric acid solution having a concentration of 2 vol % for about 12 hours, washed with water, and dried, thus manufacturing a porous structure (film).

Examples 2 to 5

Respective photonic crystal structures and porous structures were manufactured in the same manner as in Example 1, with the exception that the amount of the melanin nanoparticles was adjusted to 0.2 wt % (Example 2), 0.3 wt % (Example 3), 0.4 wt % (Example 4), and 0.5 wt % (Example 5).

Comparative Example 1

A photonic crystal structure and a porous structure were manufactured in the same manner as in Example 1, with the exception that melanin nanoparticles were not added.

The absorption spectrum of melanin, used as the light-absorbing nanoparticles, was analyzed, and the reflectance was analyzed through the reflection spectra of the photonic crystal structures (films) and the porous structures (films) of Examples 1 to 5 and Comparative Example 1. Also, changes in the color of the films were observed with the naked eye. The results are shown in FIGS. 2 to 4.

Figure 2:
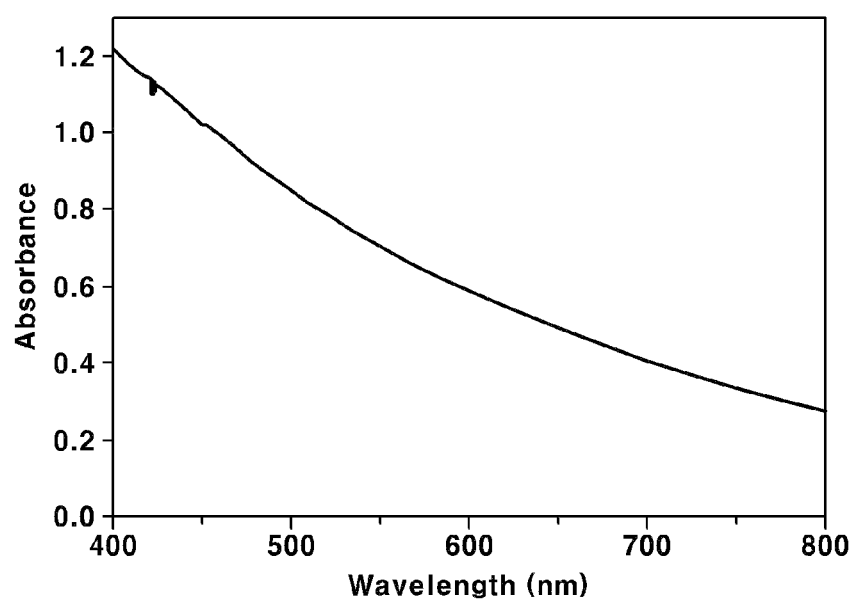
FIG. 2 shows the absorption spectrum of melanin used as exemplary light-absorbing nanoparticles according to an exemplary embodiment of the present invention.

As shown in the absorption spectrum for melanin of FIG. 2, the melanin nanoparticles absorbed all wavelengths in the entire range, whereby a specific color was not shown due to the uniform absorption of visible light.

Figure 3:
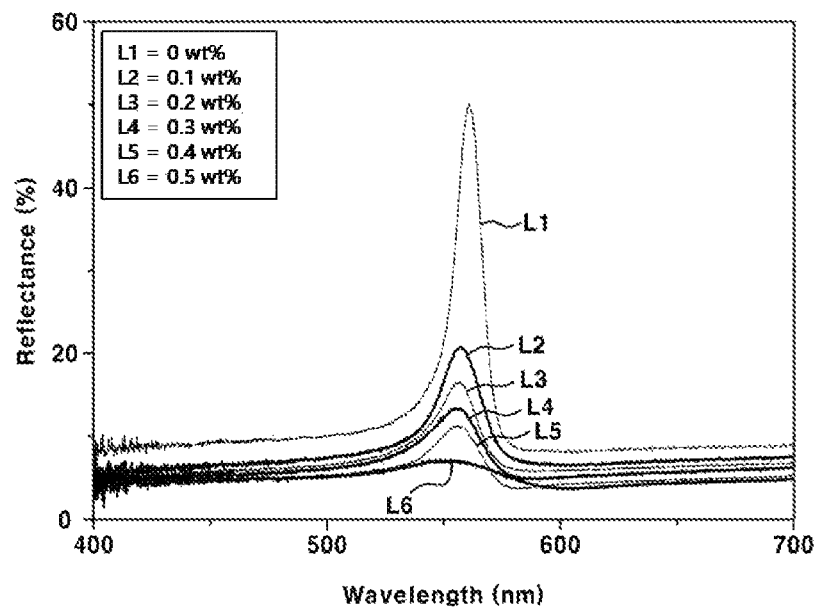
FIG. 3 shows the reflection spectrum of an exemplary photonic crystal structure comprising an exemplary melanin light-absorbing nanoparticles according to an exemplary embodiment of the present invention.

FIG. 3 shows the reflection spectrum of the photonic crystal structure containing the melanin nanoparticles, in which a peak was observed in the wavelength range of 500 nm to 600 nm. The melanin particles are contained in an amount of 0.1 wt % (L2) to 0.5 wt % (L6) based on a total amount of the ink composition. In particular, the addition of the melanin nanoparticles decreased reflectance in the entire wavelength range, thereby reducing white scattering.

Figure 4:
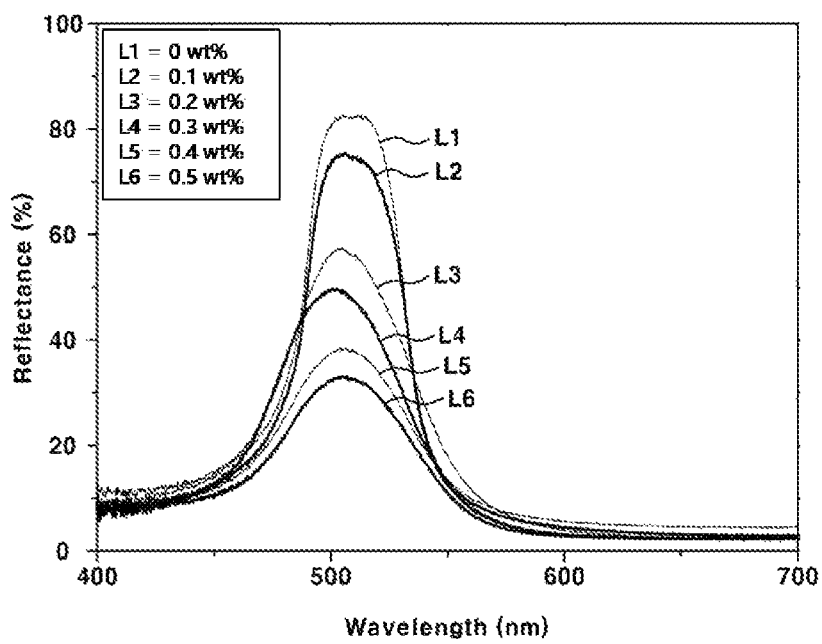
FIG. 4 shows the reflection spectrum of an exemplary porous structure, which includes exemplary melanin light-absorbing nanoparticles and in which exemplary photonic crystal inorganic particles are removed through etching.

FIG. 4 shows the reflection spectrum of the porous structure, in which silica particles are removed through etching. Particularly, the reflectance peak was increased after removal of the silica particles, and the peak wavelength was shifted to near 500 nm.

These changes may occur because the space formed by removing the silica particles was filled with air to thus increase the reflectance with an increase in the difference in refractive index between polymer media, and also because the color was turned from green to bluish green due to a decrease in effective refractive index.

Like the photonic crystal structure, the porous structure was significantly improved in color sharpness with an increase in the amount of the melanin nanoparticles, as shown in FIG. 4.

Example 6

(1) Preparation of Photonic Crystal Composition

A photonic crystal structure and a porous structure were manufactured in the same manner as in Example 1, with the exception that the average particle size of the silica particles was adjusted to 202 nm, and carbon black having an average particle size of 24 nm was added in an amount of 0.02 wt %, in lieu of the melanin nanoparticles.

(2) Formation of Photonic Crystal Structure (Film)

The photonic crystal ink composition was made to penetrate between two glass plates having a 50 µm gap therebetween, irradiated with UV light, and cured, thus manufacturing a film layer.

(3) Formation of Porous Structure (Film)

The photonic crystal structure (film) was treated with a hydrofluoric acid solution having a concentration of 2 vol % for about 12 hours, washed with water, and dried, thus manufacturing a porous structure (film).

Examples 7 to 9

Respective photonic crystal structures and porous structures were manufactured in the same manner as in Example 6, with the exception that the amount of the carbon black nanoparticles was adjusted to 0.04 wt % (Example 7), 0.06 wt % (Example 8), and 0.08 wt % (Example 9).

Comparative Example 2

A photonic crystal structure and a porous structure were manufactured in the same manner as in Example 6, with the exception that carbon black nanoparticles were not added.

The absorption spectrum of carbon black, used as the light-absorbing nanoparticles, was analyzed, and the reflectance was analyzed through the reflection spectra of the photonic crystal structures (films) and the porous structures (films) of Examples 6 to 9 and Comparative Example 2. Also, changes in the color of the films were observed with the naked eye. The results are shown in FIGS. 5 to 7.

Figure 5:
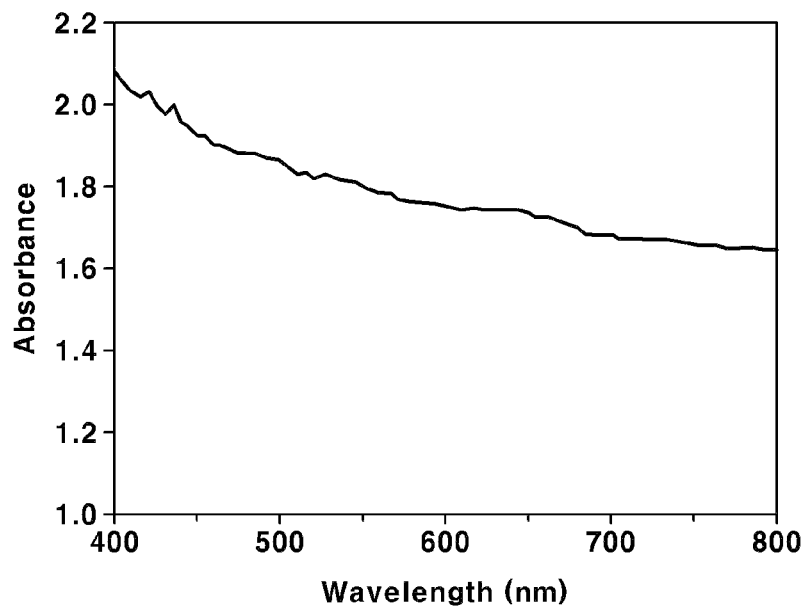
FIG. 5 shows the absorption spectrum of carbon black used as exemplary light-absorbing nanoparticles according to an exemplary embodiment of the present invention.

As shown in the absorption spectrum for carbon black of FIG. 5, the carbon black nanoparticles absorbed all wavelengths in the entire range, whereby a specific color was not shown due to the uniform absorption of visible light.

Figure 6:
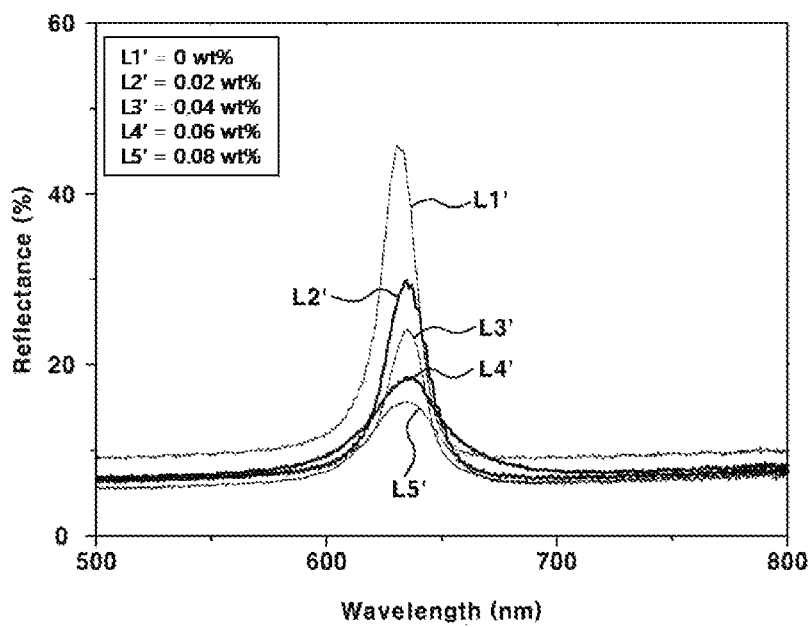
FIG. 6 shows the reflection spectrum of an exemplary photonic crystal structure comprising exemplary carbon black light-absorbing nanoparticles according to an exemplary embodiment of the present invention.

FIG. 6 shows the reflection spectrum of the photonic crystal structure containing the carbon black nanoparticles, in which a peak was observed in the wavelength range of 600 nm to 650 nm. The carbon black particles were contained in an amount of 0.02 wt % (L2') to 0.08 wt % (L5') based on a total amount of the ink composition. Here, the addition of the carbon black nanoparticles decreased reflectance in the entire wavelength range, thereby reducing white scattering.

Figure 7:
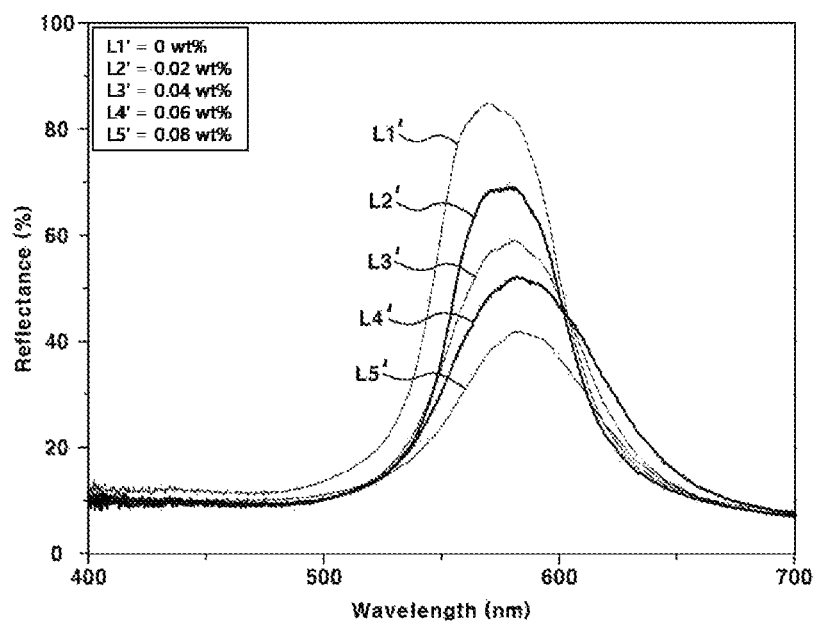
FIG. 7 shows the reflection spectrum of an exemplary porous structure, which includes exemplary carbon black light-absorbing nanoparticles and in which exemplary photonic crystal inorganic particles are removed through etching according to an exemplary embodiment of the present invention.

FIG. 7 shows the reflection spectrum of the porous structure, in which silica particles are removed through etching. Here, the reflectance peak was increased after removal of the silica particles, and the peak wavelength was shifted to the range of 550 nm to 600 nm.

These changes may occur because the space formed by removing the silica particles was filled with air to thus increase the reflectance with an increase in the difference in refractive index between polymer media, and also because the color turned blue due to a decrease in the effective refractive index.

Like the photonic crystal structure, the porous structure was significantly improved in color sharpness with an increase in the amount of the carbon black nanoparticles, as shown in FIG. 7.

Example 10

(1) Preparation of Photonic Crystal Composition

A photonic crystal structure and a porous structure were manufactured in the same manner as in Example 1, with the exception that the average particle size of the silica particles was adjusted to 173 nm, and gold having an average particle size of 50 nm was added in an amount of 0.1 wt %, in lieu of the melanin nanoparticles.

(2) Formation of Photonic Crystal Structure (Film)

The photonic crystal ink composition was made to penetrate between two glass plates having a 50 µm gap therebetween, irradiated with UV light, and cured, thus manufacturing a film layer.

(3) Formation of Porous Structure (Film)

The photonic crystal structure (film) was treated with a hydrofluoric acid solution having a concentration of 2 vol % for about 12 hours washed with water, and dried, thus manufacturing a porous structure (film).

Examples 11 to 14

Respective photonic crystal structures and porous structures were manufactured in the same manner as in Example 10, with the exception that the amount of the gold nanoparticles was adjusted to 0.2 wt % (Example 11), 0.3 wt % (Example 12), 0.4 wt % (Example 13), and 0.5 wt % (Example 14).

Comparative Example 3

A photonic crystal structure and a porous structure were manufactured in the same manner as in Example 10, with the exception that gold nanoparticles were not added.

The absorption spectrum of gold, used as the light-absorbing nanoparticles, was analyzed, and the reflectance was analyzed through the reflection spectra of the photonic crystal structures (films) and the porous structures (films) of Examples 10 to 14 and Comparative Example 3. Also, changes in the color of the films were observed with the naked eye. The results are shown in FIGS. 8 to 10.

Figure 8:
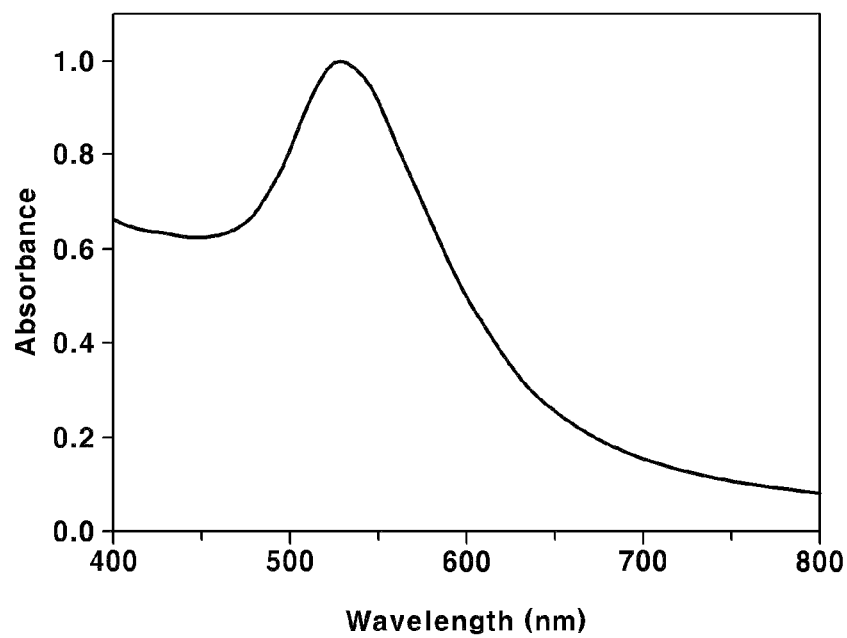
FIG. 8 shows the absorption spectrum of gold as used exemplary light-absorbing nanoparticles according to an exemplary embodiment of the present invention.

As shown in the absorption spectrum for gold of FIG. 8, the gold nanoparticles significantly absorbed light of a specific wavelength (530 nm), and thus a red color was exhibited.

Figure 9:
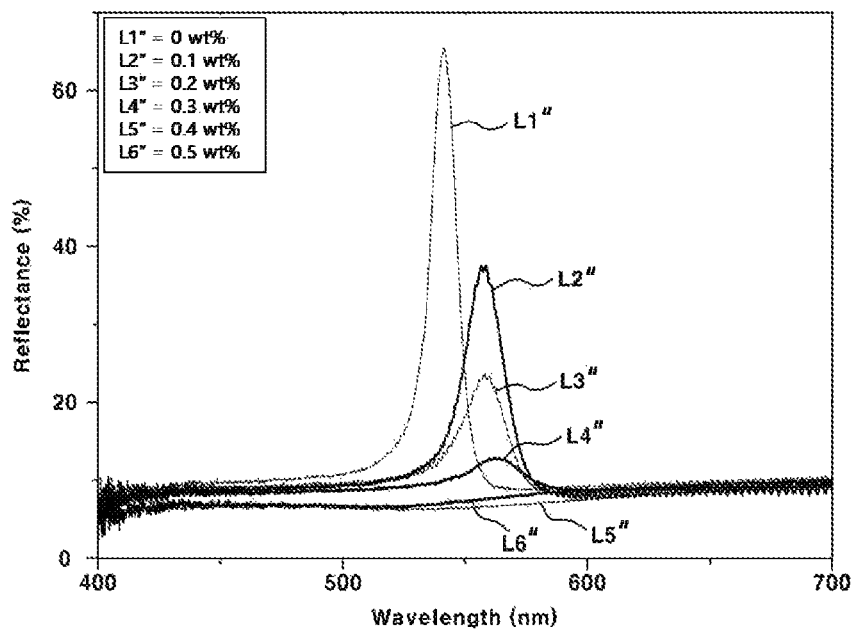
FIG. 9 shows the reflection spectrum of an exemplary photonic crystal structure comprising exemplary gold light-absorbing nanoparticles according to an exemplary embodiment of the present invention.

FIG. 9 shows the reflection spectrum of the photonic crystal structure containing the gold nanoparticles, in which a peak was observed in the wavelength range of 500 nm to 600 nm, like Example 1. The gold nanoparticles were contained in an amount of 0.1 wt % (L2") to 0.08 wt % (L5') based on a total amount of the ink composition. Here, the addition of the gold nanoparticles decreased reflectance in the entire wavelength range, thereby reducing white scattering.

Figure 10:
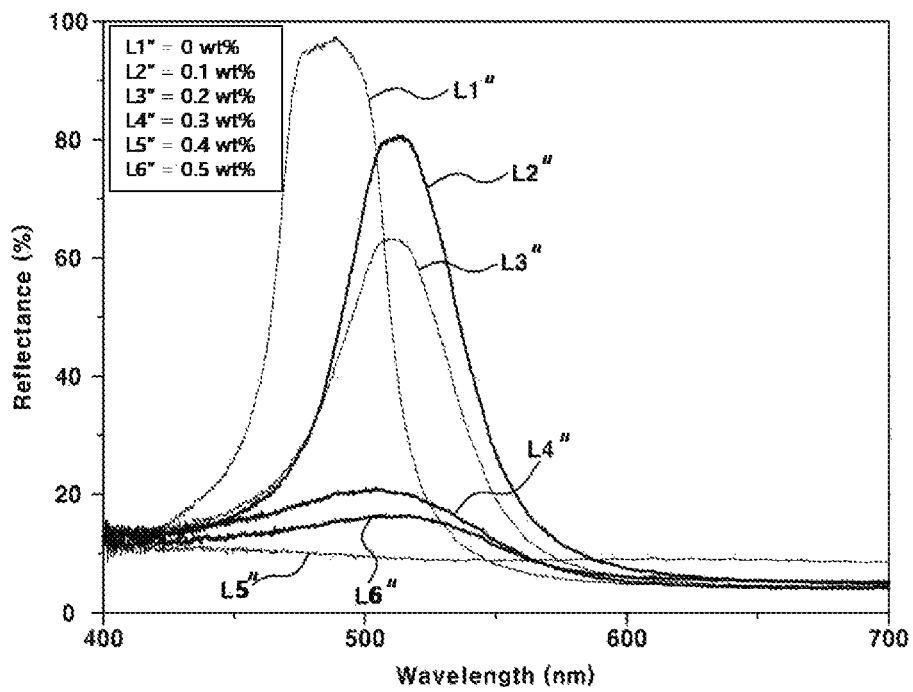
FIG. 10 shows the reflection spectrum of an exemplary porous structure, which includes exemplary gold light-absorbing nanoparticles and in which exemplary photonic crystal inorganic particles are removed through etching according to an exemplary embodiment of the present invention.

FIG. 10 shows the reflection spectrum of the porous structure, in which silica particles are removed through etching. Here, the reflectance peak was increased after removal of the silica particles, and the peak wavelength was shifted to the range of 450 nm to 550 nm.

These changes may occur because the space formed by removing the silica particles was filled with air to thus increase reflectance with an increase in the difference in refractive index between polymer media, and also because the color turned blue due to a decrease in the effective refractive index.

Like the photonic crystal structure, the porous structure was significantly improved in color sharpness with an increase in the amount of the gold nanoparticles, as shown in FIG. 10.

When gold, used as the light-absorbing nanoparticles, was added in an amount exceeding 0.3 wt %, unlike the other nanoparticles, the effect of absorbance of the gold nanoparticles alone increased, and thus the total reflectance was rather increased.

As demonstrated in Examples 1 to 14 and Comparative Examples, the amount of the light-absorbing nanoparticles according to the present invention may be adjusted, thereby controlling the structural color of the photonic crystal structure and the structural color sharpness. The appropriate amount thereof may be affected by the absorbance and size of the light-absorbing nanoparticles alone, and the size of the photonic crystal inorganic particles.

The various exemplary embodiments of the present invention have been described above in specific ranges, but the present invention is not limited thereto, and various color development effects can be obtained depending on the kind of photonic crystal inorganic particles, the particle size thereof, and the kind of light-absorbing nanoparticles having various particle sizes.

Although these exemplary embodiments of the present invention have been described with reference to the accompanying drawings, those skilled in the art will appreciate that the present invention may be embodied in other specific forms without changing the technical spirit or essential features thereof. Thus, the embodiments described above should be understood to be non-limiting and illustrative in every way.

What is claimed is:

1. An ink composition, comprising:
   inorganic particles;
   a monomer;
   a photoinitiator; and
   nanoparticles absorbing light.

2. The ink composition of claim 1, wherein the inorganic particles comprise one or more selected from the group consisting of silica, titanium dioxide, aluminum oxide, zirconium oxide, and zinc oxide.

3. The ink composition of claim 1, wherein the monomer comprises one or more selected from the group consisting of diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, ethoxylated neopentyl glycol diacrylate (NPEOGDA), propoxylated neopentyl glycol diacrylate (NPPOGDA), trimethylol propane triacrylate (TMPTA), trimethylol propane trimethacrylate (TMPTMA), pentaerythritol triacrylate (PETA), ethoxylated propoxylated trimethylol propane triacrylate (TMPEOTA)/(TMPPOTA), propoxylated glyceryl triacrylate, tris(2-hydroxyethyl) isocyanurate triacrylate (THEICTA), pentaerythritol tetraacrylate (PETTA), hexanediol diacrylate (HDDA), and dipentaerythritol pentaacrylate (DPEPA).

4. The ink composition of claim 1, wherein a volume ratio of the inorganic particles and the monomer is about 10% (v/v) to 50% (v/v).

5. The ink composition of claim 1, wherein the light-absorbing nanoparticles are contained in an amount of 0.01 wt % to 10 wt % based on a total amount of the ink composition.

6. The ink composition of claim 1, wherein the inorganic particles have a diameter of about 80 nm to 1000 nm.

7. The ink composition of claim 1, wherein, when a volume ratio of the inorganic particles and the monomer is about 10% (v/v) to 20% (v/v), the inorganic particles have a diameter of about 85 nm to 150 nm.

8. The ink composition of claim 1, wherein a volume ratio of the inorganic particles and the monomer is about 20% (v/v) to 40% (v/v) and the inorganic particles have a diameter of about 120 nm to 220 nm.

9. The ink composition of claim 1, wherein a volume ratio of the inorganic particles and the monomer is about 40% (v/v) to 50% (v/v) and the inorganic particles have a diameter of about 150 nm to 260 nm.

10. The ink composition of claim 1, wherein the nanoparticles have a diameter of about 5 nm to 150 nm.

11. The ink composition of claim 1, wherein the inorganic particles are self-assembled and cured.

12. The composition of claim 1, wherein a solvation layer is formed on a surface of the inorganic particles.

13. A photonic crystal structure manufactured by irradiating an ink composition of claim 1 with light.

14. The photonic crystal structure of claim 13, wherein the photonic crystal structure has a reflection spectrum at a wavelength ranging from about 400 nm to 700 nm.

15. The photonic crystal structure of claim 13, wherein inorganic particles form a three-dimensional lattice structure and nanoparticles are present in a space between the inorganic particles.

16. The photonic crystal structure of claim 14, wherein reflectance of the photonic crystal structure is decreased in a wavelength ranging from about 400 nm to 700 nm with an increase in an amount of the nanoparticles.

17. A method of producing a porous structure comprising a photonic crystal structure of claim 13, comprising
   preparing an ink composition comprising inorganic particles, a monomer, a photoinitiator and nanoparticles absorbing light,
   irradiating the ink composition with light to form the photonic crystal structure, and etching of the photonic crystal structure.

18. A vehicle comprising a photonic crystal structure of claim 13.

* * * * *